T. KLUGIEWICZ.
ICE CREAM DIPPER.
APPLICATION FILED JULY 18, 1917.
1,271,327.
Patented July 2, 1918.
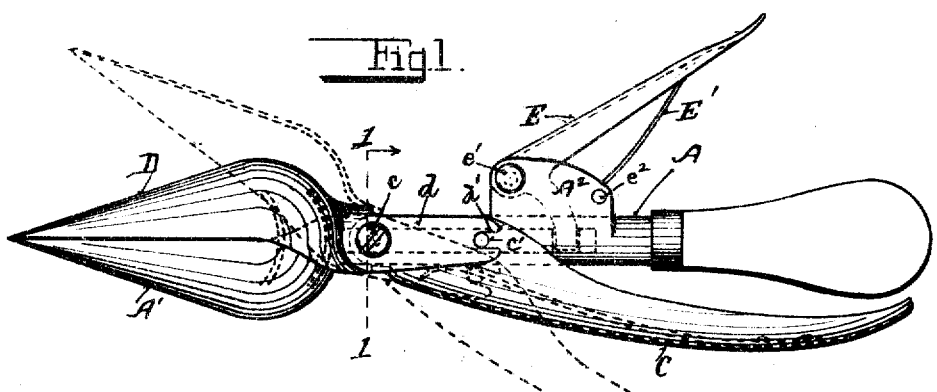
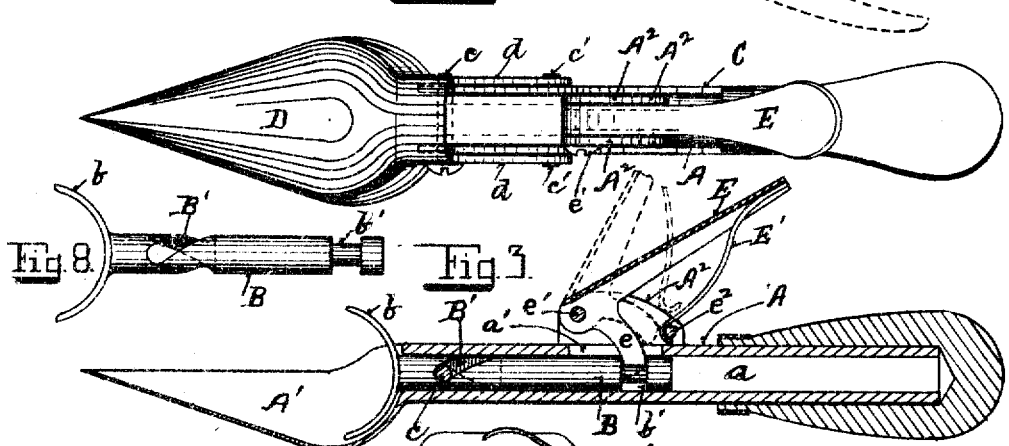
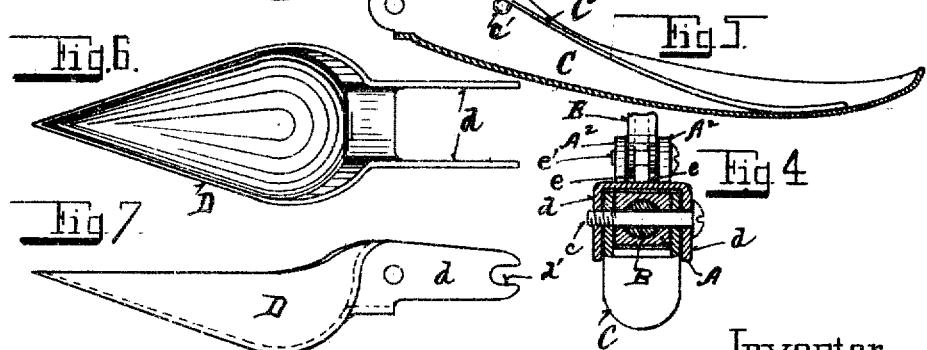
Inventor.
Tofil Klugiewicz

UNITED STATES PATENT OFFICE.

TEOFIL KLUGIEWICZ, OF ERIE, PENNSYLVANIA.

ICE-CREAM DIPPER.

1,271,327.  Specification of Letters Patent.  Patented July 2, 1918.

Application filed July 18, 1917. Serial No. 181,302.

*To all whom it may concern:*

Be it known that I, TEOFIL KLUGIEWICZ, a citizen of the United States, residing at Erie, in the county of Erie and State of Pennsylvania, have invented certain new and useful Improvements in Ice-Cream Dippers; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to vending of ice-cream, particularly in cones; and the object thereof is to provide a device which will remove and measure a quantity of ice-cream from a container, mold the same into form to fit the cone, and deliver the molded ice-cream into the cone point first.

The features of my invention are hereinafter fully described, reference being had to the accompanying drawings, in which:

Figure 1 is a side view in elevation, of my cone filler.

Fig. 2. is a view looking downward on the Fig. 1.

Fig. 3 is a longitudinal central section of Fig. 2.

Fig. 4, is a transverse section on line 1—1 in Fig. 1, looking in the direction of the arrow.

Fig. 5, is a longitudinal section of the mold operating handle removed from the cone filler.

Fig. 6, is a plan view looking into the movable part of the mold.

Fig. 7, is a side view of the same.

Fig. 8, is a view of the mold scraper removed from the structure.

In these drawings A indicates the shank or handle of the cone filler, and A' indicates a semi-conical spoon secured to one end of the shank A. The shank A is provided with a longitudinal opening $a$ therethrough, and with a slotted opening $a'$ in the wall thereof. (See Fig. 3.) On each side of the slotted opening $a'$ are ears $A^2$. Within the longitudinal opening $a$ of the shank A I place a slidable and rotatable shaft B, one end of which extends into the spoon A' (see Fig. 3) where it is provided with a scraper $b$.

The shaft B is provided with a helical slot B' therethrough, (see Figs. 3 and 8) and with a circumferential groove $b'$ near the opposite end thereof.

Pivoted upon the shank A is a spring pressed handle C by means of the pivot $c$, which also passes through the ears $d$ of the spoon shaped mold D, adapted to fit over the upper side of the spoon A', and also through the walls of the shank A and through the helical slot B' in the shaft B.

The rear ends of the ears $d$ are provided with a notch $d'$ which receive studs $c'$ on the handle C as shown in Figs. 1 and 2, so that the spoon shaped mold D and the handle C are held together by the pivot pin $c$ and operated as an integral piece of mechanism, and the said part are pivoted upon the shank A and the scraper shaft B retained within the shank A by means of the pivot pin $c$. For operating the scraper shaft B I pivot between the ears $A^2$ on the shank A, a lever E which is provided with a pair of downwardly projecting arms $e$—$e$ (see Figs. 3 and 4) by means of the pivot pin $e'$. The arms $e$—$e$ passing downwardly through the slot $a'$ and into the circumferential groove $b'$ of the shaft B, so that the downward pressure of the lever E will force the shaft B longitudinally forward in the shank A and the helical slot B' therethrough, through which the pivot pin $c$ passes, will cause the shaft B and scraper $b$ to revolve a quarter turn during the forward movement of the shaft B, the scraper $b$ thus acting as an ejector as well as a scraper.

For returning the lever E to the position thereof shown in full lines in Fig. 1, I provide a spring E' which spring at its upper end is rigidly secured to the lever E, and at its lower end slidingly engages the pin $e^2$, the hook at the lower end of the spring limiting the movement of the lever in its upward or counter-clockwise rotation by engagement with the pin $e^2$, thereby preventing the arms $e$ from becoming disengaged from the groove in the shaft B. When, however, it is desired to remove the scraper $b$ and shaft B, and the mold spoon D and handle C for the purpose of cleaning the same, or otherwise, the pivot pin $c$ is withdrawn from the structure which permits the mold spoon D to be disengaged from the handle C so that both of said pieces can be taken off from the shank A, and by unhooking the spring E' from the transverse pin $e^2$ and moving the lever E to the position thereof shown by broken lines in Fig. 3, said shaft B and scraper *b* can be moved forward and withdrawn from the shank A.

The handle C is provided with a spring C', as shown in Fig. 5, which engages the shank A for the purpose of normally maintaining the handle C and mold spoon D in the position thereof shown by broken lines in Fig. 1. From the foregoing description of the construction and operation of my invention, it will be seen that by the removal of the pivot pin *c* the structure can be dismembered and cleaned, and again assembled by replacing the pivot pin *c* as shown in Figs. 3 and 4.

Having thus fully described the construction and operation of suitable mechanism for embodying my invention, I do not desire to be limited to the exact form and construction shown, as many changes can be made therein without departing from the scope of my invention.

Therefore what I claim as new and desire to secure by Letters Patent is:

1. In a device of the class described, a hollow handle, an elongated pointed dipper bowl secured to one end thereof, a longitudinal slidable stem in said hollow handle, means to impart a partial rotation to said stem when the same is moved longitudinally, a scraper on the end of said stem within said bowl, a lever mechanism pivoted on said handle and adapted to engage and operate said scraper stem longitudinally within said handle, substantially as and for the purpose set forth.

2. In a device of the class described, a hollow handle, a pointed dipper bowl secured on one end thereof, a shaft having a helical slot therein within said hollow handle, means secured in said handle and engaging said helical slot, a scraper secured on the end of said shaft within said bowl, and spring pressed lever mechanism pivoted on said handle to move said shaft longitudinally within said handle, substantially as set forth.

3. In a device of the class described, a hollow handle, a pointed dipper bowl secured on one end thereof, a shaft in said hollow handle, a scraper on said shaft within said dipper bowl, another pointed bowl member inverted over the first mentioned dipper bowl and pivoted on said handle, a spring pressed handle pivoted on said handle and engaging said inverted bowl member to operate the same, and spring pressed lever mechanism to move said shaft longitudinally within said hollow handle, substantially as set forth.

4. In a device of the class described, a hollow handle having a longitudinal slot in the wall thereof, ears on said handle at each side of said slot, a semi-conical dipper bowl on one end of said handle, a shaft in said hollow handle extending into said bowl and having a helical slot therethrough adjacent to said bowl and a circumferential slot adjacent to the opposite end thereof, a pin through said helical slot, a scraper secured on the end of said shaft within said bowl, a spring pressed lever pivoted between said ears, an arm on said lever adapted to engage the circumferential slot in said shaft whereby said shaft may be moved longitudinally and partially rotated within said handle, substantially as set forth.

5. In a device of the class described, a hollow handle having a slot through the wall thereof, ears on said handle at each side of said slot, a semi-conical dipper bowl secured on said handle, a shaft within said hollow handle, a scraper secured on said shaft within said bowl, a lever pivoted between said ears, an arm on said lever adapted to engage said shaft, a transverse pin extending through said ears below said lever, a spring secured to said lever and pressing upon said transverse pin adapted to raise said lever upward, and a hook on said spring adapted to engage said transverse pin to limit the upward movement of said lever, substantially as set forth.

6. In a device of the class described, a handle, a dipper bowl secured to one end thereof, a spring pressed lever, projecting studs on each side of said lever, another bowl member mounted over the first mentioned bowl, ears on the base of said inverted bowl and engaging the studs on said lever, and a pivot pin passing through said ears, spring pressed lever and dipper handle adjacent to the bases of said bowls thereby forming a common pivot, upon which said parts operate, substantially as set forth.

In testimony whereof I affix my signature.

TEOFIL KLUGIEWICZ.